US012103450B2

(12) United States Patent
Stuiber

(10) Patent No.: US 12,103,450 B2
(45) Date of Patent: Oct. 1, 2024

(54) METHOD TO PRODUCE A CONNECTION FOR AN EQUIPMENT PART OF A VEHICLE

(71) Applicant: GRAMMER AG, Ursensollen (DE)

(72) Inventor: Martin Stuiber, Stulln (DE)

(73) Assignee: GRAMMER AG, Ursensollen (DE)

( * ) Notice: Subject to any disclaimer, the term of this patent is extended or adjusted under 35 U.S.C. 154(b) by 76 days.

(21) Appl. No.: 18/071,928

(22) Filed: Nov. 30, 2022

(65) Prior Publication Data
US 2023/0191967 A1 Jun. 22, 2023

(30) Foreign Application Priority Data
Dec. 2, 2021 (DE) ...................... 10 2021 131 809.2

(51) Int. Cl.
*B60N 2/75* (2018.01)
(52) U.S. Cl.
CPC .................................... *B60N 2/757* (2018.02)
(58) Field of Classification Search
CPC . B60N 2/757; B60N 2/75; F16B 4/004; F16B 2/00; F16B 2/20; B21D 39/06; B23P 11/00
See application file for complete search history.

(56) References Cited

U.S. PATENT DOCUMENTS

| 6,059,238 A * | 5/2000 | Reynolds | B60N 2/75 16/229 |
| 6,692,213 B1 * | 2/2004 | Butler | B21J 15/10 414/412 |
| 11,390,202 B2 * | 7/2022 | Stuiber | F16C 11/04 |
| 2021/0387278 A1 * | 12/2021 | Suzuki | B23K 10/022 |

FOREIGN PATENT DOCUMENTS

DE  102011012097 A1  8/2012

\* cited by examiner

*Primary Examiner* — Mark R Wendell
(74) *Attorney, Agent, or Firm* — LUCAS & MERCANTI, LLP; Klaus P. Stoffel

(57) ABSTRACT

A method for producing a connection, including the steps of: providing a connecting part and a retaining part; making a cut-out in the retaining part, wherein a plane is created by the cut-out; turning a deformation region of the retaining part surrounding the cut-out out of the plane such that the cut-out is enlarged and a seat is produced; arranging the connecting part in the cut-out; and forming the deformation region back in the direction of the plane such that the cut-out is reduced in size and the retaining part is connected at least force-fittingly to the connecting part.

7 Claims, 8 Drawing Sheets

METHOD TO PRODUCE A CONNECTION FOR AN EQUIPMENT PART OF A VEHICLE

CROSS-REFERENCE TO RELATED APPLICATIONS

The present application claims priority of DE 10 2021 131 809.2, filed Dec. 2, 2021, the priority of this application is hereby claimed and this application is incorporated herein by reference.

BACKGROUND OF THE INVENTION

The invention relates to a method for producing a connection of a connecting part and a retaining part for an interior fitting part of a vehicle. Within the meaning of the invention, a vehicle is an air, land or water vehicle.

Previously, welded connections were often used for fastening parts of the frame of an arm support or a headrest-supporting bracket. This had the disadvantage that changes in the microstructure occurred as a result of the welding process and led to disadvantageous properties in respect of the product. Furthermore, the parts were provided with a coating, for example, which was damaged by the welding process and necessitated a subsequent, cost-intensive coating. In addition, the welding method limited the choice of materials.

SUMMARY OF THE INVENTION

An object of the invention was to create a method for producing a shaft connection in which no heat influence zones arise, which have disadvantageous properties on the component.

It was also an object of the invention to create such a method in which a coating is not destroyed.

Furthermore, it was an object of the invention to create such a method in which the choice of materials for the combination of connection partners can be made flexibly.

The method for producing a connection comprises the following method steps:

A connecting part and at least one retaining part are provided. The retaining part can be formed by a sheet metal part, for example.

A cut-out is made in the retaining part, a plane being created by an inside surface of the cut-out.

A region of the retaining part surrounding the cut-out is turned out of the plane, i.e., formed such that the cut-out is enlarged and a seat is produced. For example, the region is turned out, i.e., formed, into a frustoconical or convex shape. In principle, the region can be formed on both sides in relation to the opening.

The connecting part is arranged in the seat in the cut-out. For example, an end region of the connecting part is arranged in the seat such that it passes through the cut-out.

The region is deformed back in the direction of the plane such that the cut-out is reduced in size and the retaining part is connected at least force-fittingly to the connecting part. In addition to the force-fitting connection, other connection methods such as adhesive bonding can also be used.

The advantage of the method according to the invention consists in that the production of the connection does not require any heating, which could have a negative influence on the microstructure or damage any coating present.

Furthermore, a flexible choice of materials for the parts to be connected is possible because this is not limited by a required suitability for use in a welding method.

For example, an additional part is fastened to the retaining part. The additional part is used for the additional production of at least one force-fitting fastening to absorb forces and dissipate them via the retaining part to which the additional part is fastened.

The cut-out is made in the additional part and the retaining part jointly or in both parts separately. If the cut-outs are produced separately, the additional part and the retaining part are fastened to one another later such that the openings overlap.

Alternatively, the additional part and the retaining part are fastened to one another first and then the cut-out is produced jointly in both parts.

Method characterized in that the region of the additional part and of the retaining part surrounding the cut-out is turned out before or after the fastening of the additional part and the retaining part. If the turning out takes place after the additional part and the retaining part have been fastened to one another, the turning out can take place only in one direction. If the region is turned out separately on both parts, it is possible for the turned-out region of the additional part to extend in the same direction as the turned-out region of the retaining part or alternatively for the regions to extend in opposite directions.

For example, the region of the additional part and the region of the retaining part are turned out in opposite directions in relation to a longitudinal axis of the seat. In this way, a very secure connection between the connecting part and the assembly of additional part and retaining part can be obtained.

A cross-section of the cut-out and a cross-section of the connecting part are designed, for example, such that a form-fitting connection is produced in addition to the force-fitting connection after the connecting part is arranged in the cut-out.

According to a second aspect, the invention also relates to a frame for an arm support of an armrest or a center console, wherein at least one connecting part is fastened with a first connection to a first retaining part and with a second connection to a second retaining part, wherein at least one connection is produced by a connection produced by the method according to the first aspect of the invention.

According to a third aspect, the invention relates to a supporting rod bracket for a headrest comprising two retaining rods and a crossbar. End regions of the crossbar are fastened with connections to an end region of each retaining rod. The connection is produced by the method according to the first aspect of the invention.

Exemplary embodiments of the invention are described by way of example in the description of the figures below, with reference to the drawings. For the sake of clarity, including where different exemplary embodiments are discussed, the same or comparable parts or elements or regions are provided with the same reference signs, in some cases with the addition of lower-case letters.

Within the scope of the invention, features which are described only in relation to one exemplary embodiment can also be provided in any other exemplary embodiment of the invention. Even if not shown in the drawings, such modified exemplary embodiments are covered by the invention.

All the disclosed features are essential to the invention by themselves. The disclosure content of the described prior art devices is hereby also incorporated in full in the disclosure of the application, also for the purpose of including individual or multiple features of these documents in one or more claims of the present application.

DETAILED DESCRIPTION OF THE INVENTION

Figure 1:
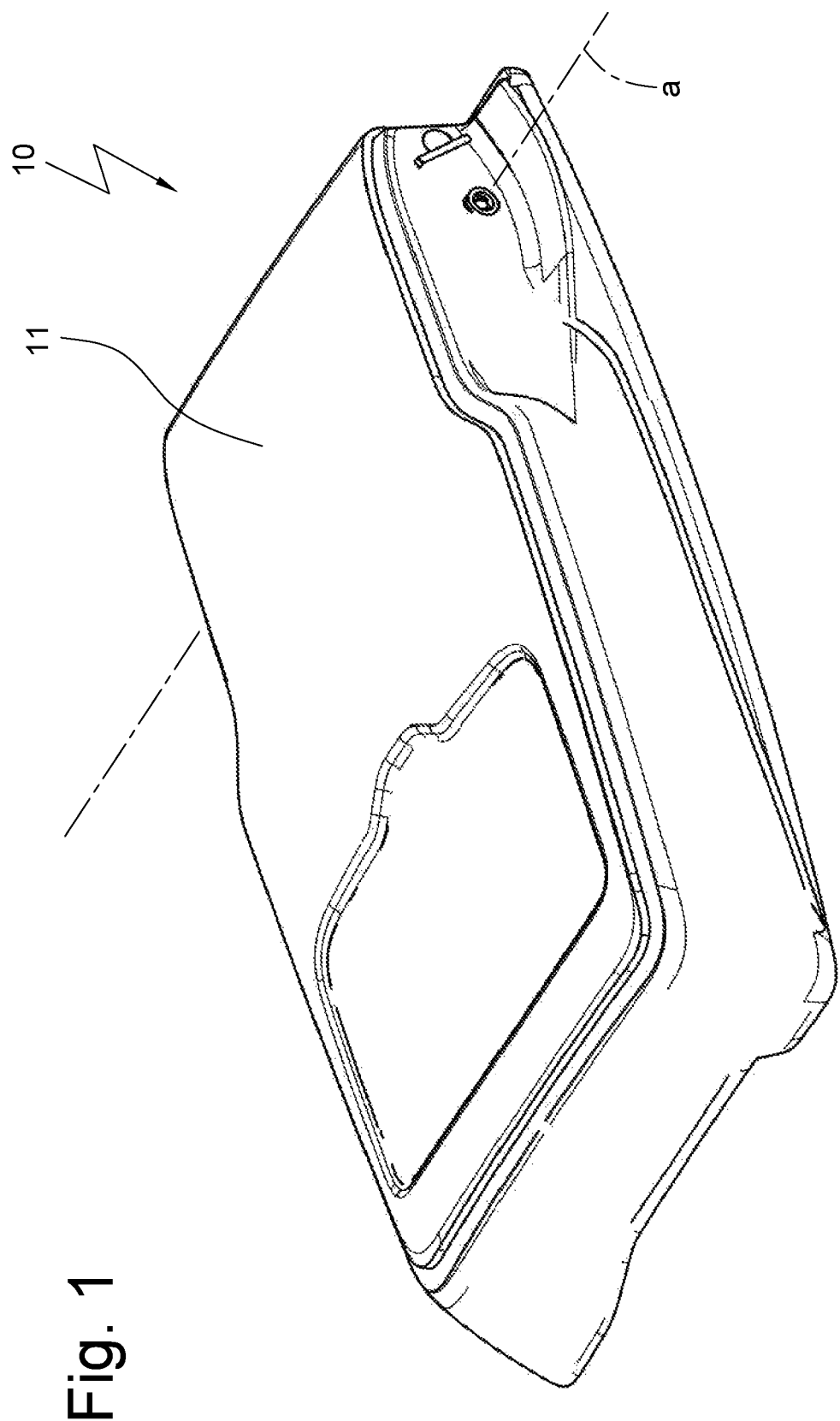
FIG. 1 shows a perspective illustration of an arm support of an armrest.

FIG. 1 shows an arm support 10 of an armrest including a trim 11. The trim can comprise, for example, a plastic housing and a cushion, where necessary. The arm support 10 is mounted pivotably about a pivot axis a on a structure (not shown) of a vehicle.

Figure 2:
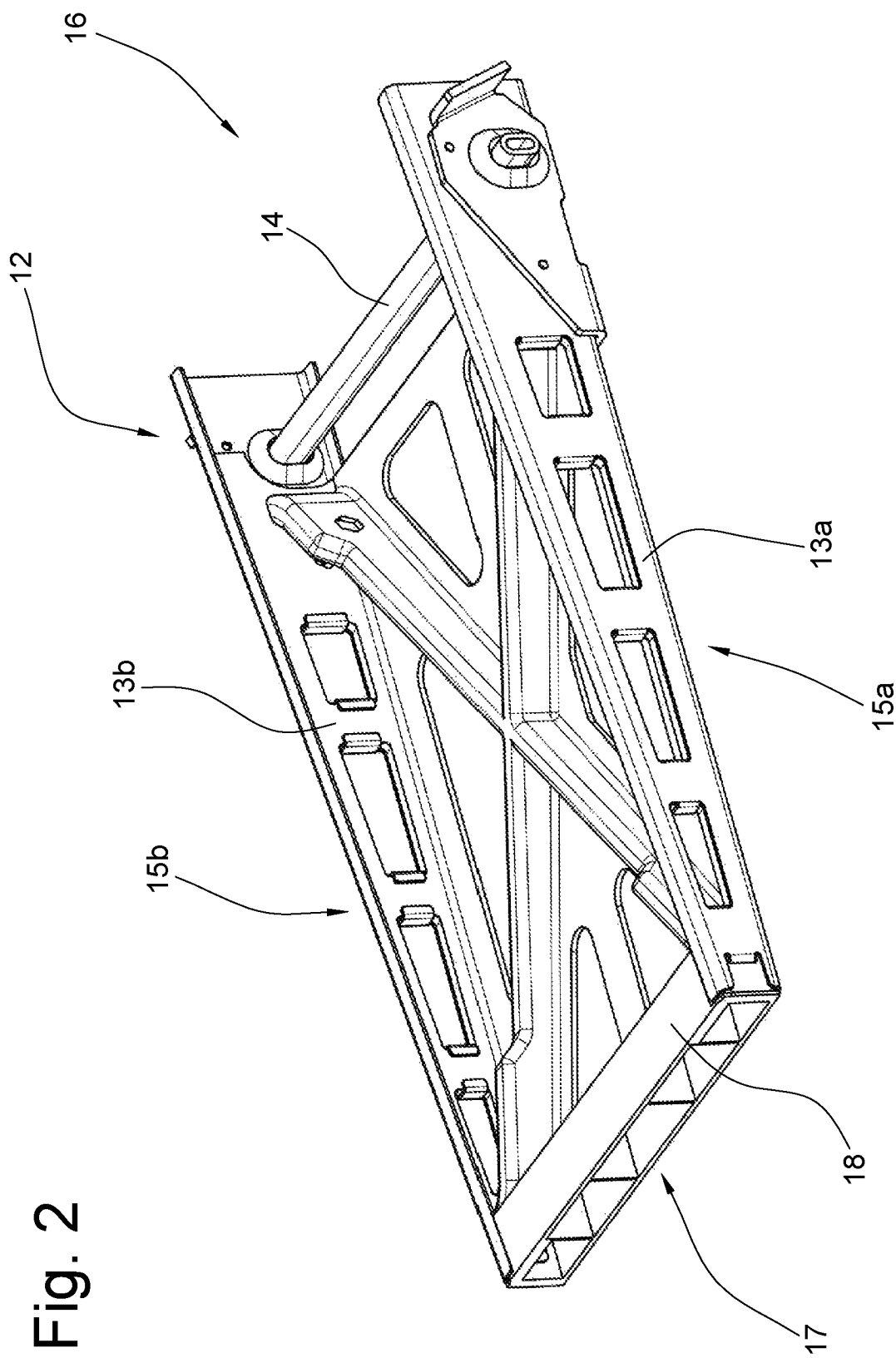
FIG. 2 shows a perspective illustration of a frame of the arm support with an insert.

According to FIG. 2, the arm support 10 comprises a frame 12, which has two retaining parts 13a and 13b and a connecting part 14. In this example, the connecting part 14 is designed as a shaft. The retaining parts 13a and 13b are arranged in side regions 15a and 15b of the arm support 10. A rear region 16 of the arm support 10 can be mounted on a vehicle structure in a manner not shown. A front region 17 forms a free end of the arm support 10. Also visible in FIG. 2 is a structural part 18, which can be made of plastic, for example, and is used for stabilization and for provision of an arm support surface. The structural part 18 connects the retaining parts 13a and 13b in the front region 17.

The connecting part 14 forms connections to the retaining parts 13a and 13b. In the present case, an auxiliary part 19a is fastened to the retaining part 13a, and an auxiliary part 19b is fastened to the retaining part 13b, but the auxiliary parts 19a and 19b are not strictly necessary for the invention.

Each retaining part 13a and 13b is subjected as an individual part to a method step in which a cut-out 21 is made in the retaining part. A deformation region 22 adjacent to the cut-out 21 is turned out of a plane E1 created by a wall of the retaining part 13a or 13b such that an inside surface of the cut-out 21 creates a protrusion in relation to the plane E1 (see FIG. 3). In the same way, the auxiliary parts 19a and 19b are provided with a cut-out 23, and a deformation region 24 adjacent to the cut-out 23 is turned out of a plane E2 created by a wall of the auxiliary part 19a or 19b, so that an inside surface of the cut-out creates a protrusion in relation to the plane E2.

The auxiliary part 19a is then fastened to the retaining part 13a such that the cut-outs 21 and 23 align with a central axis m which is oriented orthogonally to the plane E1.

The fastening can take place by means of customary methods. If welding methods are to be avoided owing to the influence of heat, form-fitting fastening methods such as riveting or screw-fastening, for example, are suitable. The cut-outs 21 and 23 each create a seat 25a and 25b for an end region 20a and 20b of the connecting part 14. The respective end region 20a and 20b passes through the cut-outs 21 and 23 according to FIG. 3.

Figure 3:
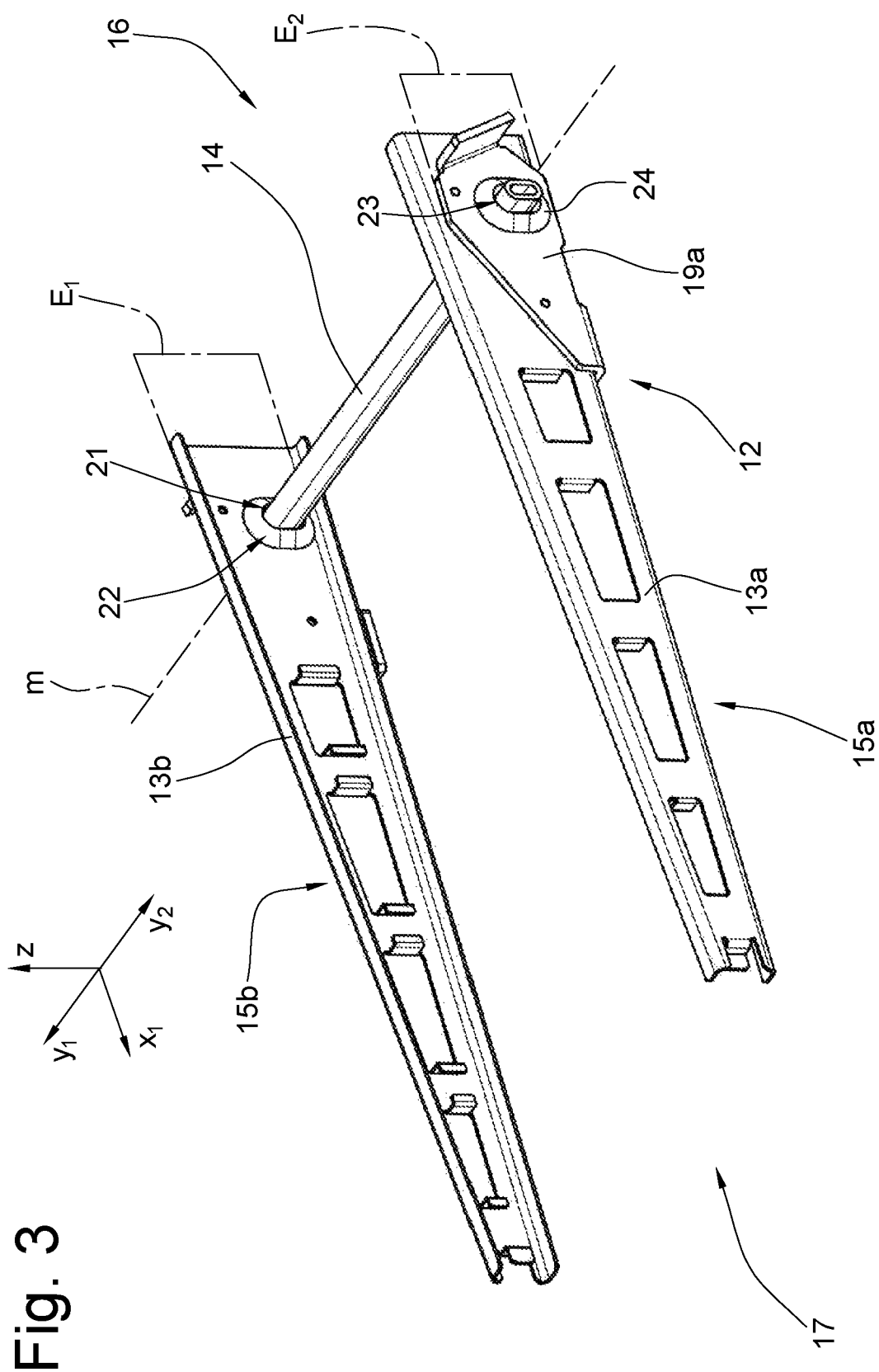
FIG. 3 shows a perspective illustration of the frame according to FIG. 2 without an insert.
Figure 4:
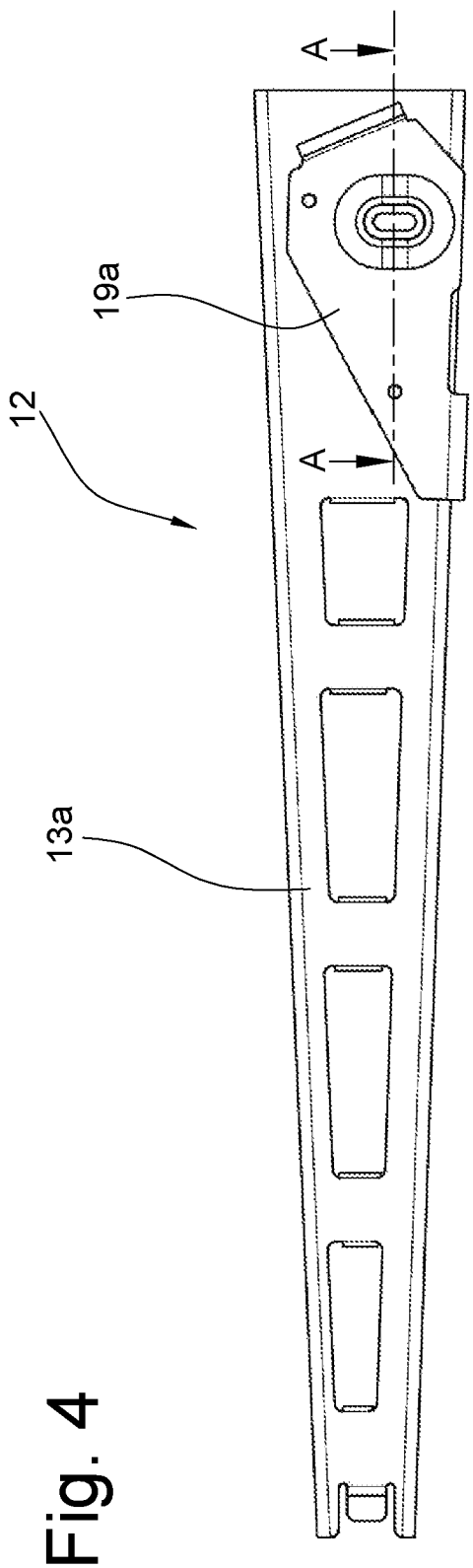
FIG. 4 shows a side view of the frame according FIG. 3.
Figure 5:
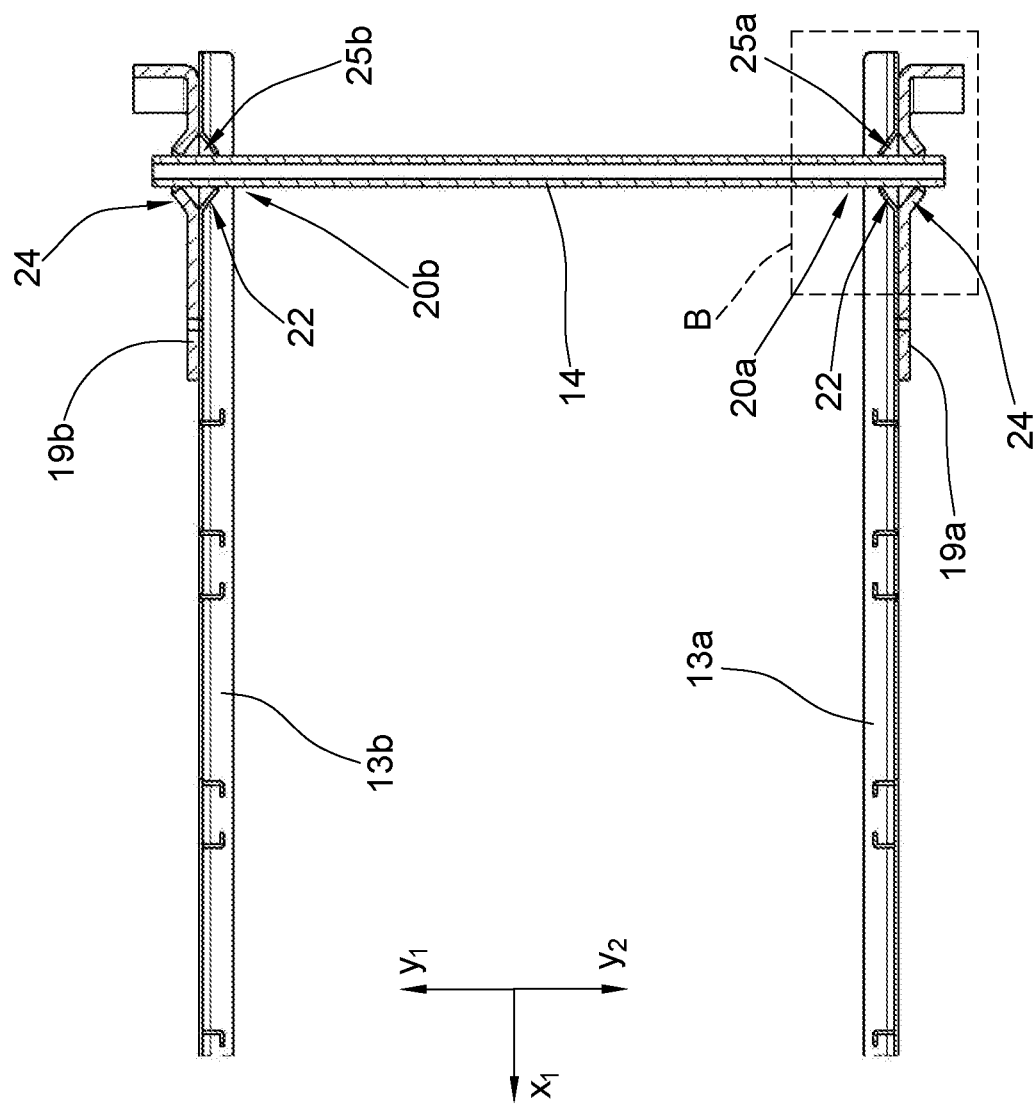
FIG. 5 shows a sectional illustration according to section line A-A in FIG. 4.

In FIGS. 3, 4 and 5, the connecting part 14 and the end regions 20a and 20b are arranged in their seat 25a and 25b. In the turned-out position of the deformation regions 22 and 24, the end regions can be arranged with play in the cut-outs 21 and 23. The further forming method for producing the connection will be described below using the enlarged detail of the seat 25a according to FIG. 6.

Figure 6:
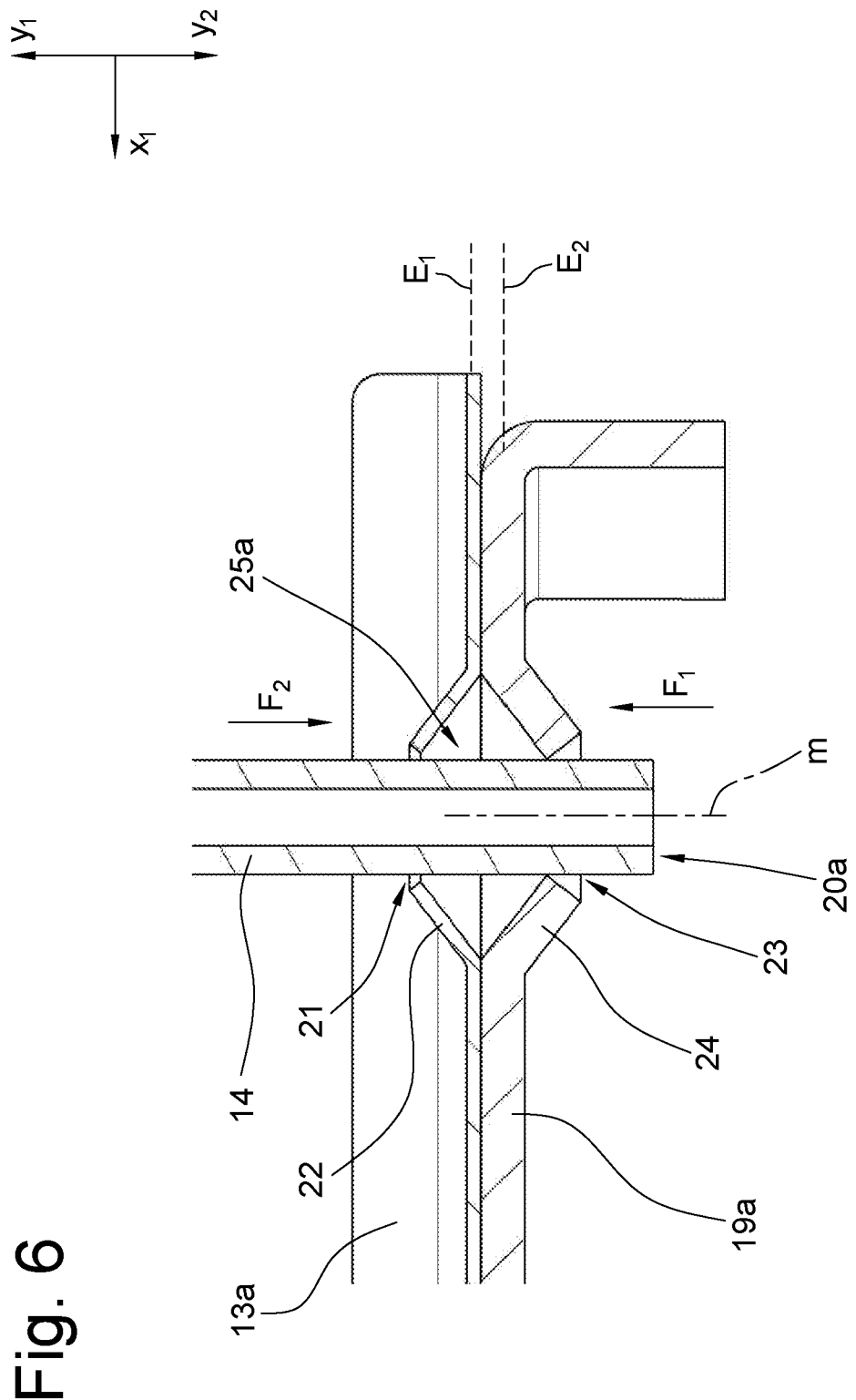
FIG. 6 shows a detail illustration according to detail line B in FIG. 5.
Figure 7:
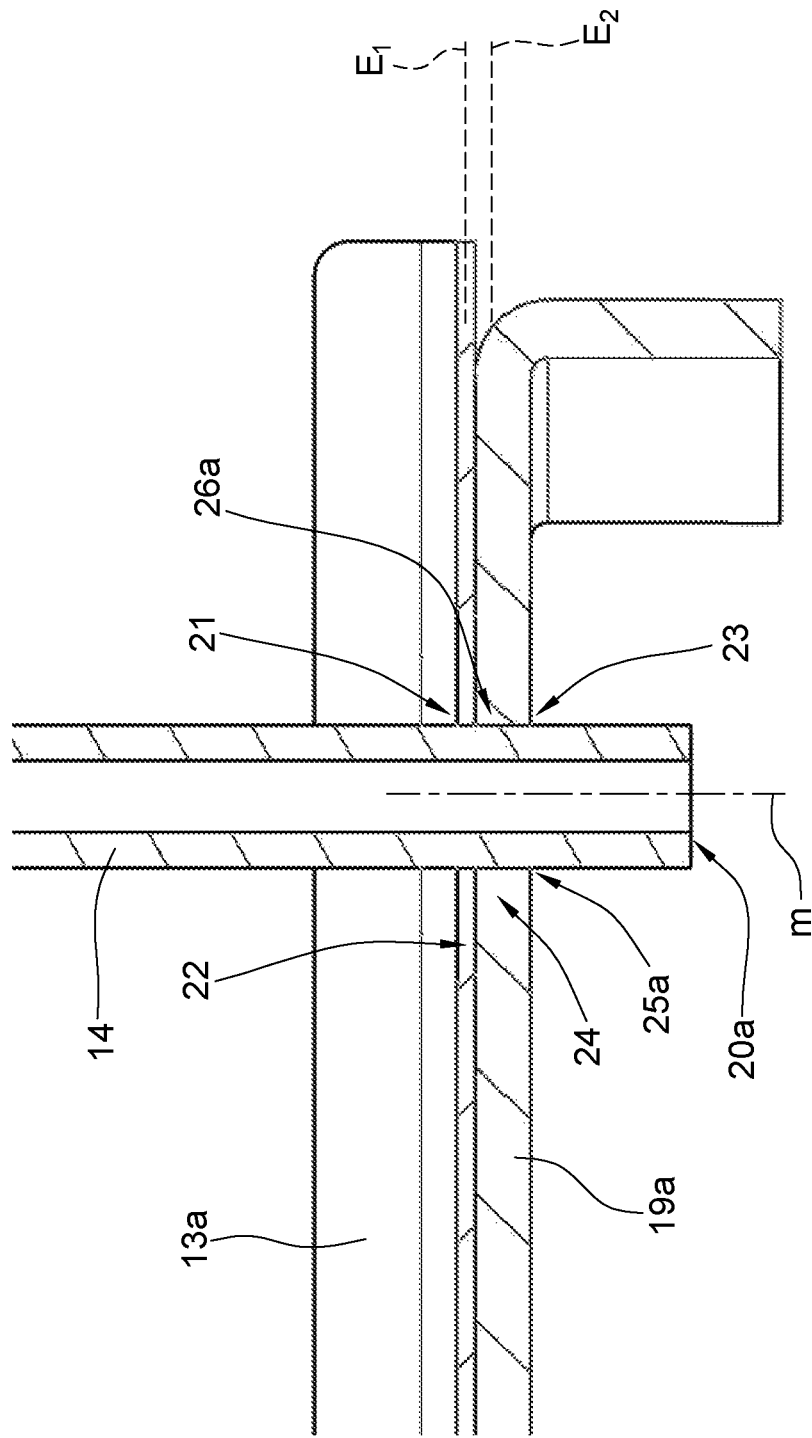
FIG. 7 shows a detail illustration according to FIG. 6 in which the regions have been pushed back into the plane.

By means of a tool (not shown), a force F1 is applied to the deformation region 22 in direction y2, and a force F2 is applied to the deformation region 24 in direction y1 (see FIG. 6). The deformation region 22 is deformed into the plane E1, and the deformation region 24 is deformed into the plane E2. In the process, a force fit is created between the connecting part 14 and the retaining part 13a and between the connecting part 14 and the auxiliary part 19a, as a result of which a secure connection 26a is produced (see FIG. 7).

Figure 8:
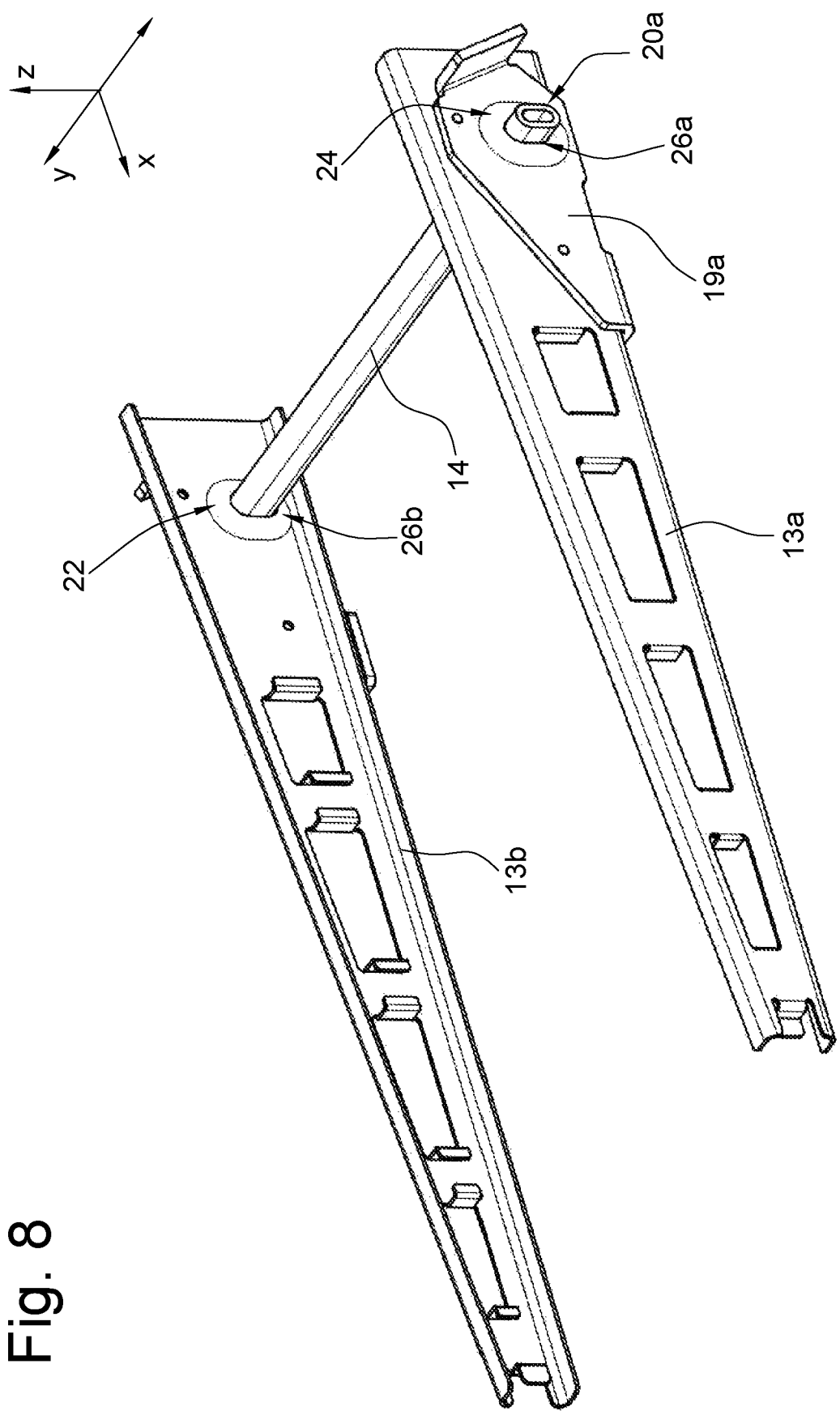
FIG. 8 shows a perspective illustration of the frame according to FIG. 3 in which force- and form-fitting connections are present between the connecting part and the retaining parts.

In FIG. 8, the frame 12 with the connections 26a and 26b can be seen. Forces in the x, y or z direction and in the rotary directions u1 and u2 can be transmitted between the unit of retaining part 13a and auxiliary part 19a and of retaining part 13b and auxiliary part 19b and the connecting part 14 by means of the connections 26a and 26b. To transmit forces in the rotary direction, a form fit can additionally be created between the connecting part 14 and the unit of retaining part and auxiliary part.

According to an alternative embodiment, the auxiliary parts 19a and 19b are omitted, for example.

In the present exemplary embodiment, the turned-out forming region 22 of the seat 25a protrudes in direction y1 in relation to the plane E1, and the turned-out forming region 24 protrudes in direction y2 in relation to the plane E2, according to FIG. 6. According to an alternative embodiment, both forming regions 22 and 24 could also protrude in direction y1 or alternatively in direction y2.

According to a further alternative, all the aforementioned embodiments could be applicable, for example, to a supporting rod bracket, wherein a first retaining rod and a second retaining rod form the retaining parts, and a crossbar connecting the retaining rods forms the connecting part. The connection between the retaining rods and end regions of the crossbar can be produced with the same method as in the present exemplary embodiment.

The invention claimed is:

1. A method for producing a connection, comprising the steps of:
   providing a connecting part and a retaining part;
   making a cut-out in the retaining part, wherein a plane is created by the cut-out;
   turning a deformation region of the retaining part surrounding the cut-out out of the plane so that the cut-out is enlarged and a seat is produced;
   arranging the connecting part in the cut-out; and
   forming the deformation region back in a direction of the plane so that the cut-out is reduced in size and the retaining part is connected at least force-fittingly to the connecting part, further including fastening an auxiliary part to the retaining part.

2. The method according to claim 1, including making the cut-out in the auxiliary part and the retaining part jointly or making the cut-out in both parts separately and fastening the parts to one another so that the cut-outs overlap.

3. The method according to claim 1, including turning out the deformation regions of the auxiliary part and of the retaining part before or after the fastening of the auxiliary part and the retaining part.

4. The method according to claim 1, including turning out the deformation regions of the auxiliary part and of the retaining part in opposite directions relative to a longitudinal axis of the seat.

5. The method according to claim 1, wherein a cross-sectional shape of the cut-out and a cross-sectional shape of the connecting part are configured to produce a form-fitting connection in addition to the force-fitting connection after the connecting part is arranged in the cut-out.

6. An arm support having a frame comprising at least a first retaining part, a second retaining part, and at least one connecting part that forms a connection to the first retaining part and a connection to the second retaining part, wherein at least one of the connections is produced by a method for producing a connection, comprising the steps of: providing a connecting part and a retaining part; making a cut-out in the retaining part, wherein a plane is created by the cut-out; turning a deformation region of the retaining part surrounding the cut-out out of the plane so that the cut-out is enlarged and a seat is produced; arranging the connecting part in the cut-out; and forming the deformation region back in a direction of the plane so that the cut-out is reduced in size and the retaining part is connected at least force-fittingly to the connecting part.

7. A supporting rod bracket comprising: a first retaining part; a second retaining part; and a connecting part that forms a connection to each of the retaining parts, wherein the connection is produced by a method for producing a connection, comprising the steps of: providing a connecting part and a retaining part; making a cut-out in the retaining part, wherein a plane is created by the cut-out; turning a deformation region of the retaining part surrounding the cut-out out of the plane so that the cut-out is enlarged and a seat is produced; arranging the connecting part in the cut-out; and forming the deformation region back in a direction of the plane so that the cut-out is reduced in size and the retaining part is connected at least force-fittingly to the connecting part.

* * * * *